United States Patent
Komarov et al.

(10) Patent No.: US 9,489,217 B2
(45) Date of Patent: Nov. 8, 2016

(54) DYNAMIC SOFTWARE DOCUMENTATION

(75) Inventors: Andrey Komarov, Saint Petersburg (RU); Mikhail Kondratyev, Saint Petersburg (RU); Mikhail Vaysman, Saint Petersburg (RU)

(73) Assignee: Oracle America, Inc., Redwood City, CA (US)

( * ) Notice: Subject to any disclaimer, the term of this patent is extended or adjusted under 35 U.S.C. 154(b) by 1577 days.

(21) Appl. No.: 12/330,546

(22) Filed: Dec. 9, 2008

(65) Prior Publication Data

US 2010/0146483 A1    Jun. 10, 2010

(51) Int. Cl.
*G06F 9/44* (2006.01)

(52) U.S. Cl.
CPC .............. *G06F 9/4446* (2013.01); *G06F 8/73* (2013.01)

(58) Field of Classification Search
USPC ........................................................ 717/123
See application file for complete search history.

(56) References Cited

U.S. PATENT DOCUMENTS

| | | | | |
|---|---|---|---|---|
| 5,278,980 A * | 1/1994 | Pedersen | ............ | G06F 17/30011 |
| 5,903,897 A * | 5/1999 | Carrier et al. | | |
| 5,987,251 A * | 11/1999 | Crockett et al. | ............... | 717/115 |
| 6,253,151 B1 * | 6/2001 | Ohler et al. | .................... | 701/409 |
| 6,366,933 B1 * | 4/2002 | Ball et al. | ..................... | 715/203 |
| 6,389,481 B1 * | 5/2002 | Malcolm | ........................ | 719/310 |
| 7,103,506 B2 * | 9/2006 | Friedrich et al. | ............. | 702/184 |
| 7,149,980 B1 * | 12/2006 | Nelson et al. | ................ | 715/764 |
| 7,277,901 B2 * | 10/2007 | Parker et al. | | |
| 7,447,988 B2 * | 11/2008 | Ross | ............... | 715/221 |
| 7,454,744 B2 * | 11/2008 | Bhogal et al. | ................ | 717/122 |
| 7,475,286 B2 * | 1/2009 | Altaf et al. | ..................... | 714/27 |
| 7,496,854 B2 * | 2/2009 | Hedloy | ................. | G06F 17/276 715/780 |
| 7,788,640 B2 * | 8/2010 | Grimaldi | ....................... | 717/123 |
| 7,849,405 B1 * | 12/2010 | Coletta | ................. | G06F 9/4446 715/708 |
| 8,046,741 B2 * | 10/2011 | Bhogal et al. | ................ | 717/122 |
| 8,255,439 B2 * | 8/2012 | Prager | ............... | G06F 17/30011 707/822 |
| 8,938,717 B1 * | 1/2015 | Subramanian | ........... | G06F 8/68 717/120 |
| 2001/0042080 A1 * | 11/2001 | Ross | ............................ | 707/506 |
| 2002/0116702 A1 * | 8/2002 | Aptus et al. | .................. | 717/170 |
| 2002/0144255 A1 * | 10/2002 | Anderson | ..................... | 717/174 |
| 2002/0191002 A1 * | 12/2002 | Friedrich et al. | ............ | 345/632 |

(Continued)

OTHER PUBLICATIONS

"Output", Merriam-Webster, retrieved on Feb. 27, 2014, <http://www.merriam-webster.com/dictionary/output>, 1 page.*

(Continued)

*Primary Examiner* — Marina Lee
(74) *Attorney, Agent, or Firm* — Brooks Kushman P.C.

(57) ABSTRACT

A computer device for modifying software documentation for a software package is provided. A first computer is configured to provide the software documentation including help information related to the software package to a second computer and to receive a command from the second computer that corresponds to providing the help information from the software documentation. The first computer is further configured to transmit the help information from the software documentation in response to the command and to receive an identification from the second computer indicating an identity of the second computer and a request from the second computer to modify the help information within the software documentation. The first computer is further configured to modify the help information within the software documentation in accordance to the request in response to determining that the identity of the second computer is authorized to modify the help information within the software documentation.

15 Claims, 6 Drawing Sheets

(56) References Cited

U.S. PATENT DOCUMENTS

| | | | |
|---|---|---|---|
| 2003/0145282 A1* | 7/2003 | Thomas et al. | 715/513 |
| 2003/0145310 A1* | 7/2003 | Thames et al. | 717/123 |
| 2003/0163801 A1* | 8/2003 | Thames et al. | 717/123 |
| 2004/0031015 A1* | 2/2004 | Ben-Romdhane et al. | 717/107 |
| 2004/0117206 A1* | 6/2004 | Steinberger et al. | 705/2 |
| 2004/0153788 A1* | 8/2004 | Krietemeyer et al. | 714/25 |
| 2004/0186817 A1* | 9/2004 | Thames et al. | 707/1 |
| 2005/0097462 A1* | 5/2005 | Lumera et al. | 715/522 |
| 2006/0015840 A1* | 1/2006 | Marvel et al. | 717/101 |
| 2006/0143594 A1* | 6/2006 | Grimaldi | 717/123 |
| 2006/0150090 A1* | 7/2006 | Swamidass | 715/517 |
| 2006/0156077 A1* | 7/2006 | Altaf et al. | 714/57 |
| 2008/0098356 A1* | 4/2008 | Ericsson et al. | 717/123 |
| 2008/0228671 A1* | 9/2008 | Nagaraj | 705/500 |

OTHER PUBLICATIONS

"Indicate", Merriam-Webster, retrieved on Feb. 27, 2014, <http://www.merriam-webster.com/dictionary/indicating>, 1 page.*

* cited by examiner

DYNAMIC SOFTWARE DOCUMENTATION

BACKGROUND

1. Technical Field

One or more embodiments described herein generally relate to a system and method for generating dynamic software documentation.

2. Background Art

Software providers generally provide software documentation (or software help documentation) in one of two approaches. In a first approach, the software documentation is a set of static documents shipped together with the software product itself. In the first approach, the static documents are difficult to or cannot be updated once the software is shipped. Software vendors may update the static documents through special patches by the software provider. However, such a practice may not be employed by all software providers. Problems generally associated with static documents in the event these documents are not capable of being updated is that the documentation may be out-dated over time as the software changes or evolves in the future. Further, the documentation is not capable of being corrected in the event such documentation includes incorrect information.

In a second approach, the software documentation may be provided on the software provider's website. Problems generally associated with the second approach appear because the documentation is disconnected from the software itself. Such a condition causes the user to spend additional time searching for the documentation. In addition, the documentation provided on the software provider's website may be outdated. A number of software providers may have limited resources and may not be able to devote resources in keeping the documentation current (or updated) in view of evolving software versions or enhancements. Further, software providers provide the software documentation only in English in most cases.

In general, both approaches rely on technical writers that produce the content of the documentation and can modify content in the documentation in response to requests/issued identified by the users. Often times, synchronization between the software documentation and the software product itself may require for a significant amount of coordination between the developers of the software and the technical writers. Coordination issues between the software developers and the technical writers may increase resulting software costs and jeopardize the integrity of the help information contained in the documentation.

SUMMARY

In at least one embodiment, a computer device for modifying software documentation for a software package is provided. A first computer is configured to provide the software documentation including help information related to the software package to a second computer and to receive a command from the second computer that corresponds to providing the help information from the software documentation. The first computer is further configured to transmit the help information from the software documentation in response to the command and to receive an identification from the second computer indicating an identity of the second computer and a request from the second computer to modify the help information within the software documentation. The first computer is further configured to modify the help information within the software documentation in accordance to the request in response to determining that the identity of the second computer is authorized to modify the help information within the software documentation.

BRIEF DESCRIPTION OF THE DRAWINGS

The embodiments of the present invention are pointed out with particularity in the appended claims. However, other features of the various embodiments will become more apparent and will be best understood by referring to the following detailed description in conjunction with the accompany drawings in which:

DETAILED DESCRIPTION

Detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

One or more embodiments of the present invention generally provide for a plurality of computers in electrical communication with each other to generate dynamic software documentation so that one or more authorized users may edit, add, or delete information contained in the software documentation via at least one of the computers. The software documentation generally includes "help" information related to one or more aspects of a software product. Such help information may be steps or procedures describing the manner in which various operations within the software product may be performed. The computers may each include hardware, software and or any combination thereof for executing instructions, but not limited to, allowing the authorized user to edit, add, delete and save information to/from the software documentation.

The computers may include hardware, software or any combination thereof for executing instructions to allow a plurality of authorized users the ability to access the software documentation simultaneously and to allow the editing, addition, and deletion of such information from the software documentation to be performed simultaneously. It is generally contemplated that at least one system and method as disclosed herein includes hardware, software, and or combination thereof for performing one or more of the operations described with respect to the generation of, access to, addition to, and/or deletion from the software documentation.

Figure 1:
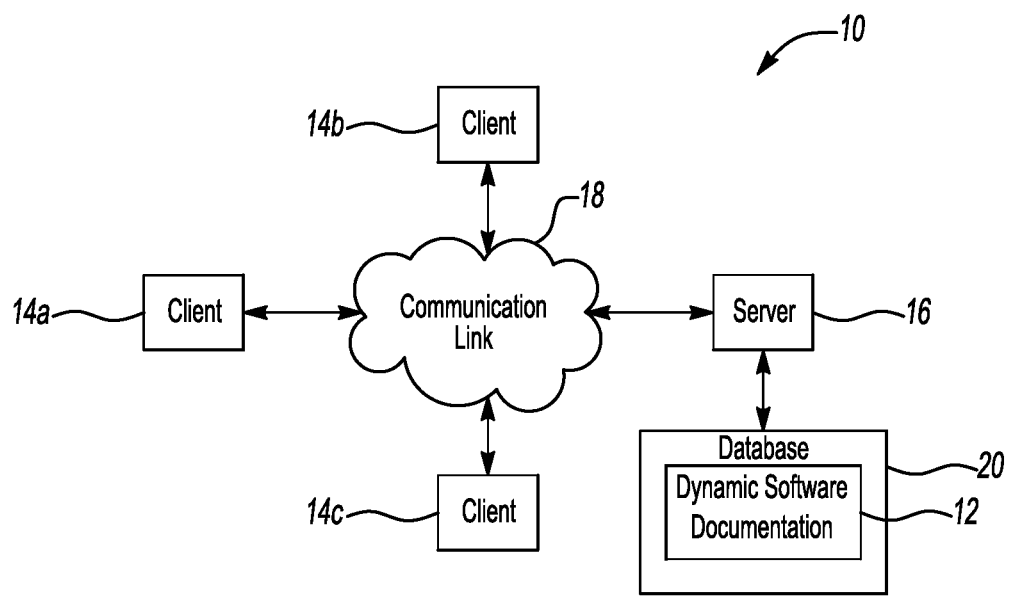
FIG. 1 depicts a system for generating and/or modifying dynamic software documentation in accordance to one embodiment of the present invention.

Referring now to FIG. 1, a system 10 for generating and/or modifying dynamic software documentation 12 in accordance to one embodiment of the present invention is shown. The system 10 comprises a plurality of clients 14a-14n and a server 16. The clients 14a-14n and the server 16 may each comprise a computer which include processors for executing instructions to facilitate access and modification to the software documentation 12. A communication link 18 facilitates bi-directional electrical communication between the clients 14a-14n and the server 16. The communication link 18 may be implemented as a Transmission Control Protocol/Internet Protocol (TCP/IP) to facilitate data communication therebetween. A database 20 is operably coupled to the server 16. Each of the clients 14a-14n are capable of accessing contents within the database 20. The database 20 includes the dynamic software documentation 12. It is generally contemplated that the database 20 may include one or more software documents 12 which each correspond to a software package. A software package is generally defined as the entire set of software which may include, but not limited to, software code, binary files, help files, test scenarios, install/uninstall instructions and configuration files. Each software package may be divided into different units or sections.

The dynamic software documentation 12 is generally defined as a help document that includes help related information that is specific for a software package. A user may access the software documentation 12 via the clients 14a-14n to locate information related to various attributes about the software package. The software documentation 12 may include, but not limited to, various definitions/terms used in connection with the software package, instructions with respect to the manner in which various operations may be performed in connection with the software package, a search engine for locating particular definitions/terms (or help articles) and/or various user interaction attributes such as forums and/or links to web logs which are directed to the software package. Such search engines may be in the form of dialogs, wizards or web pages.

In general, one or more users with authorized rights may access the software documentation 12 to review information, add information directly to the software documentation 12, and/or delete information from the software documentation 12. For example, an authorized user may access the software documentation 12 to obtain help information with respect to a particular application or attribute contained within the software package. While within the software documentation 12, the authorized user may add information to the software documentation 12 in the event the software documentation 12 fails to include pertinent information that may be relevant for other users of the software documentation.

For example, if by chance the authorized user determines that a description of an operation requires additional information than that already contained in the software documentation, the user may add such information to bolster the contents of the software documentation 12. Such an example may include the situation whereby a new software release has occurred and the user has identified a particular manner in performing an operation related to a new aspect of the software package. In such a case, the user may add text to serve as help information to identify the manner in which the operation can be performed for the new feature contained in the software package. In yet another example, the authorized user may correct information within the software documentation 12 that is not correct or needs to be updated. In another example, the user may simply delete outdated or incorrect data from the software documentation 12 via the client 14a-14n. Any information added to the software documentation may be added in any language.

It is generally contemplated that the authorized user make any such changes to the software documentation 12 as needed to ensure that the help information contained in the software documentation 12 is correct or recent for any foreseeable set of conditions. For example, the authorized user may simply edit information within the software documentation 12 that is not correct irrespective of the state or version of the software package. Meaning, it is not necessary for a new software version to be released in order for the authorized user to add, edit, or delete content to/from the software documentation 12. Existing software packages that have been consumed by users for a number of years may have any such information within the software documentation 12 edited or modified in the manner described in accordance to one or more embodiments of the present invention.

The users of the clients may be defined as persons who are not employed by the software provider or persons not acting as agents on behalf of the software provider. Conventionally, software providers employ or contract persons to add, delete, or edit contents within the software documentation 12. The system 10 encourages the user community to moderate the contents of the software documentation 12. Such a setting generally ensures that the latest and most accurate information is stored within the software documentation 12 and that such information is provided by the authorized users who found issues or can add information to clarify points of interest within the software documentation. The system 10 encourages the user community to participate in order to build a precise and inexpensive documentation system. Users may add content to the software documentation 12 based on what is unclear with respect to the software package. It is generally recognized that conventional methods for providing help documents may lag behind the current version of software packages and that the software providers may cease to update the help documents particularly after a software package has evolved or matured after a period of time. The term "user" may apply to either the person operating the client 14a-14n or directly to the client 14a-14n itself. Further, the term "authorized user" may apply to a person having clearance to create, access, and/or modify the software documentation 12 or to the client 14a-14n having clearance to create, access, and/or modify the software documentation 12.

The authorized user may access the software documentation 12 via the communication bus 18 and utilize any number of mechanisms to add, edit, or delete help information on the software documentation 12. In one example, the documentation editing model may be close to or similar to the tool used by wikipedia.org or other suitable open source tools. It is also contemplated that the software provider may also provide a proprietary editing model to enable changes to the software documentation 12. In such an example, the proprietary editing model may be provided along with the software package. The server 16 interfaces with the open source software via the communication link 18 and enables changes to the software documentation 20 in response to the changes performed at the clients 14a-14n. It is generally contemplated that the authorized user may be capable of generating the software documentation 20 in the event such documentation does not exist. The generation of the software documentation 12 and the modification of the software documentation 12 will be discussed in more detail in connection with FIG. 2.

In general, the clients 14a-14n may transmit requests related to the software documentation 12 to the server 16. For example, the clients 14a-14n may transmit a plurality of requests over the communication link 18 and to the server 16 simultaneously or serially so that the users situated at the corresponding clients 14a-14n are capable of accessing and modifying the software documentation 12 simultaneously or serially. In one example, the user may be presented with the software documentation 12 over a web portal (or web page) and change the software documentation 12 while in the web portal. Each request transmitted by a corresponding client 14a-14n to the server 16 may correspond to a search for pages or help information in the software documentation 12, an edit that is to be made to a particular section of the software documentation 12, a new page (or new text) that is to be within the software documentation 12, and/or the generation of a software documentation 12 (that previously did not exist). The server 16 will send a confirmation response to the request that is presentable in a web page format (or other suitable format) in the event the request corresponds to an edit that is to be made, a new page that is to be added or an entire new set of software documentation is needed to be created.

Figure 2:
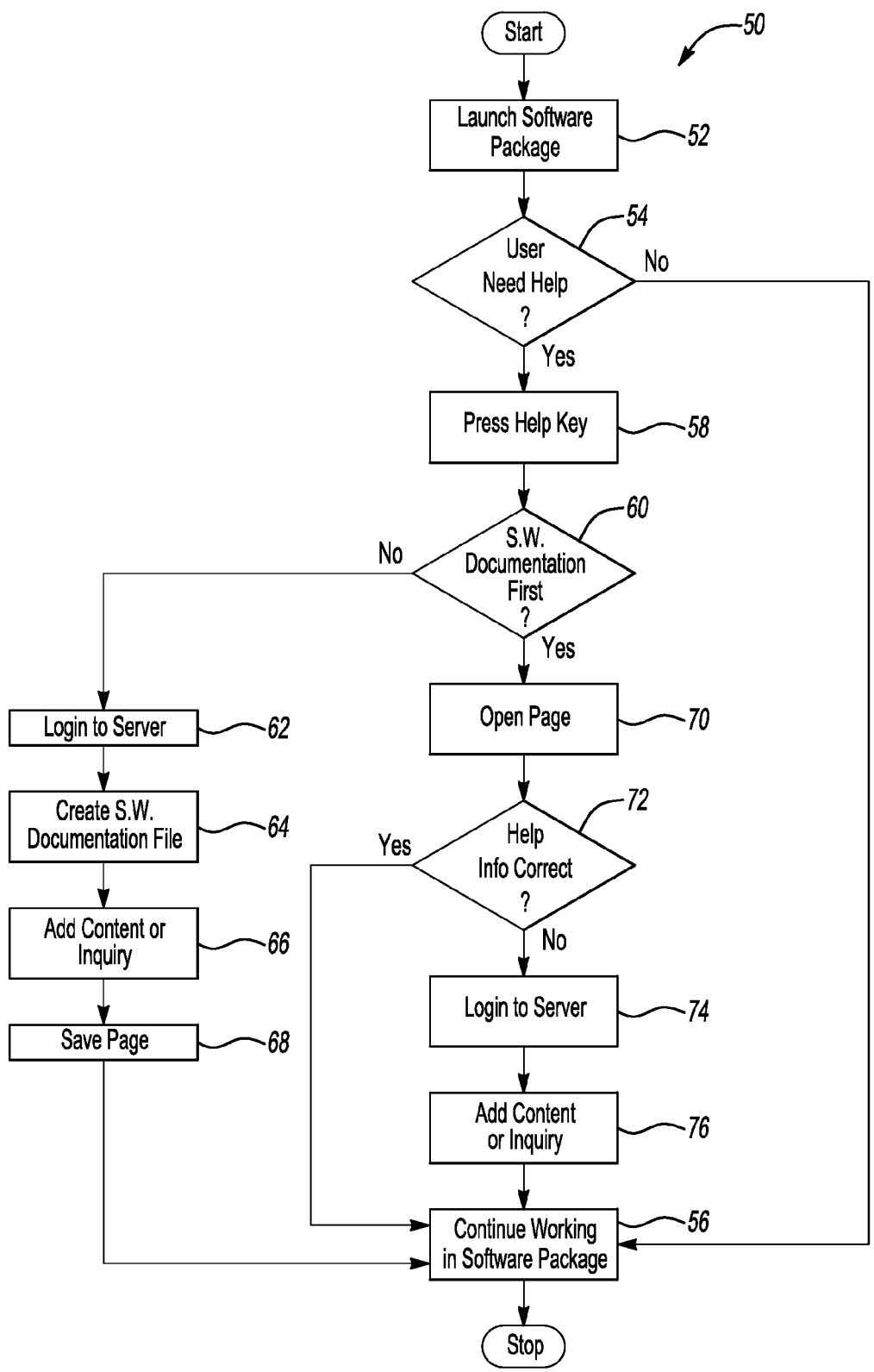
FIG. 2 depicts a first flow diagram for performing various operations with respect to the dynamic software documentation with the system of FIG. 1.

Referring now to FIG. 2, a first flow diagram 50 for performing various operations with respect to the dynamic software documentation with the system 10 of FIG. 1 is shown. The clients 14a-14n and/or the server 16 may include hardware, software of a combination thereof for executing instructions related to at least one of the operations disclosed in the diagram 50.

In operation 52, the user launches the software package at the client 14a-14n. It is generally contemplated that such a software package include, but are not limited to, Microsoft® products such a MS-Word®, Excel®, Powerpoint®, or SUN Microsystems™ products such as NetBeans™, Solaris™, and StarOffice™ to name a few. The system 10 may be adapted for use with any software package does not include initial help information so that such help information can be developed in accordance to one or more embodiments disclosed herein. Further, the system 10 may be adapted for use with any software package that includes help information or any software package that is capable of requiring help information for the dissemination of help information to the various users of such software products.

In operation 54, the user determines whether help is needed with respect to a particular attribute associated with the software package. If the user determines that no help is needed, the diagram 50 moves to operation 56 and allows the user to continue work within the software package. If the user determines that help is needed, the diagram 50 moves to operation 58.

In operation 58, the user presses a help key on the keyboard of the client 14a-14n. The help system may be accessed via a special functionality key, a pre-designated key or a combination of keys on the keyboard, or by selecting the "HELP" button or other suitable arrangement. In another example, the user may select the help option via voice commands.

In operation 60, a determination is made as to whether the software package includes a corresponding software document that includes help information. For example, the server 16 communicates with the clients 14a-14n over the communication link 18 to provide status as to the existence of the software documentation. In the event the server 16 determines that no such software documentation for the software package that is currently being operated by the user is not available, the diagram 50 moves to operation 62. In the event the server 16 determines that the software documentation 12 for the software package that is currently being operated by the user is available, the diagram moves to operation 70.

In operation 62, the server 16 communicates that no such software documentation 12 is available to the client 14a-14n. The client 14a-14n may prompt the user to login into the server 16 to create or generate the software documentation 12. The server 16 confirms the identity of the client 14a-14n or the user of the client 14a-14n to determine whether the identity of the client 14a-14n or the user of the client 14a-14n is an authorized user.

In operation 64, the user creates the software documentation through the client 14a-14n. It is appreciated that the clients 14a-14n act as an interface and that the server 16 generates the software documentation 12 in response to data transmitted by the client 14a-14n over the communication link 18. As noted above, at least one of the client 14a-14n, the communication link 18, and the server 16 interface an open source for facilitating communication with respect to creating the software documentation 12. In one example, a wiki engine may be used to allow the user to update the software documentation 12. The software documentation 12 may be presented to the user via the clients 14a-14n in a web browser type format. The user may use the wiki engine to view, add, delete, or edit help information within the software documentation. It is contemplated that the HELP engine provide synchronous access to the information among authorized users. In addition, the user may use the wiki engine to view, and/or store updates/history and sync access among authorized users. The server 16 may upload such information on the software documentation 12 and save on the database 20.

In operation 66, the user may generate the software documentation 12 and leave an inquiry for another user with respect to the reason the user needed help for a particular attribute noted in connection with operation 54. The user may also contribute help information with respect to other attributes that the user may have knowledge with respect to the software package to assist other users who later intend to access the software documentation 12 to obtain such help information.

In operation 68, the user saves the information generated in the software documentation 12 and exits therefrom. The server 16 stores a copy of the software documentation 12 on the database 20 for later retrieval by other users.

In operation 56, the user continues to work in the software package.

In operation 70, the client 14a-14n opens a corresponding page within the software documentation that corresponds to the particular subject that the user requires assistance on. Such an operation occurs in response to the server 16 transmitting data to the client 14a-14n to indicate that the software documentation 12 exists. It is contemplated that the help information from the software documentation 12 corresponds to the subject matter in which the user requires assistance on so that additional searching may be minimized while the user is in the software documentation 12. This condition will be discussed in more detail in connection with FIG. 3.

In operation 72, the user determines whether the help information being presented in the corresponding page of the software documentation 12 is correct. For example, the user may perform the operation as indicated in the software documentation 12 to achieve the desired purpose. In the event the user is able to perform the operation in the manner outlined in the software documentation 12, the diagram 50 moves to operation 56. In the event the user is unable to perform the operation as indicated in the software documentation 12 to achieve the desired purpose, the diagram 50 moves to operation 74.

In operation 74, the user logs into the server 16 to modify the help information in the software documentation 12. Such a login is generally needed to ensure the user is an authorized user for making various changes to the software documentation 12. The server 16 confirms the identity of the client 14a-14n or the user of the client 14a-14n to determine whether the identity of the client 14a-14n or the user of the client 14a-14n is an authorized user.

In operation 76, the user may add help content or leave an inquiry within the software documentation 12. For example, the user may provide a comment within the software documentation 12 indicating that the help information corresponding to the particular operation that the user required assistance on was not correct. The user may leave an inquiry within the software documentation 12 for another user to provide the appropriate the help information within the software documentation 12. In the event the user is able to perform the desired operation within the software package even if the help information identified in the software documentation 12 is incorrect, the user may delete the incorrect help information and add new help information with respect to the feature the user required assistance on so that such information is available to other users in the future.

Figure 3:
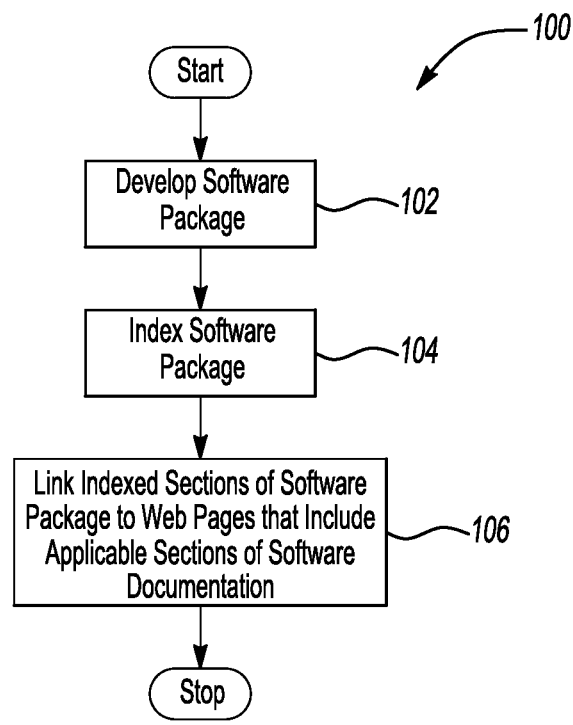
FIG. 3 depicts a second flow diagram for indexing portions of the software package to web pages displaying relevant sections of the software documentation.

Referring now to FIG. 3, a second flow diagram 100 for indexing portions of the software package to web pages displaying relevant sections of the software documentation 12 is shown.

In operation 102, the software provider develops the software package.

In operation 104, the software provider indexes the software package to generate a plurality of sections. As noted above, the entire software package may include, but not limited to, software code, binary files, help files, test scenarios, install/uninstall instructions, etc. The sections of the software package may include, but not limited to, a wizard, menu or dialog prompt. Each section of the software package may have corresponding help information for inclusion within the software documentation 12.

In operation 106, the server 16 maps corresponding sections of the software documentation 12 to the indexed plurality of sections. For example, unique Ids may be used to link the indexed plurality of sections to the corresponding sections of the software documentation 12. In such a case, the server 16 may associate web pages corresponding to the indexed plurality of sections so that applicable web pages are presented to the user in response to the user selecting the help key/function when the corresponding indexed section of the software package is being utilized by the user. In such a case, the section of the software documentation 12 that corresponds to the particular indexed section may be presented to the user to minimize the amount of time and effort needed to find the applicable section of the software documentation 12. For example, in the event a user wants to save a file while a dialog box is open related to allowing a user to save the file and the user needs help and selects the help key, the client 14a-14n searches for the unique ID that corresponds to the dialog box and transmits the unique ID to the server 16. The server 16 locates the applicable section of the software documentation 12 in response to the unique ID and transmits the applicable section of the software documentation 12 to the client 14a-14n.

An example of such a mapping operation may be accomplished via Java. For example, each software section can be associated with an appropriate compilation unit with a concrete name stated within its source code (e.g., fully qualified name). Such a qualified name may be used as a unique ID for the corresponding help information. Restricted symbols may be substituted in accordance with a special replacement agreement.

Referring now to FIGS. 4a-4d, various screen displays 200, 202, 208 and 212 depicting various capabilities of the system 10 in accordance to one embodiment of the present invention are shown. The screen displays 200, 202, 208 and 212 as depicted in FIGS. 4a-4d are shown for exemplary purposes. It is generally contemplated that the screen displays 200, 202, 208 and 212 may be presented in any number of configurations and is not intended to be limited to that as shown in FIGS. 4a-4d.

Figure 4A:
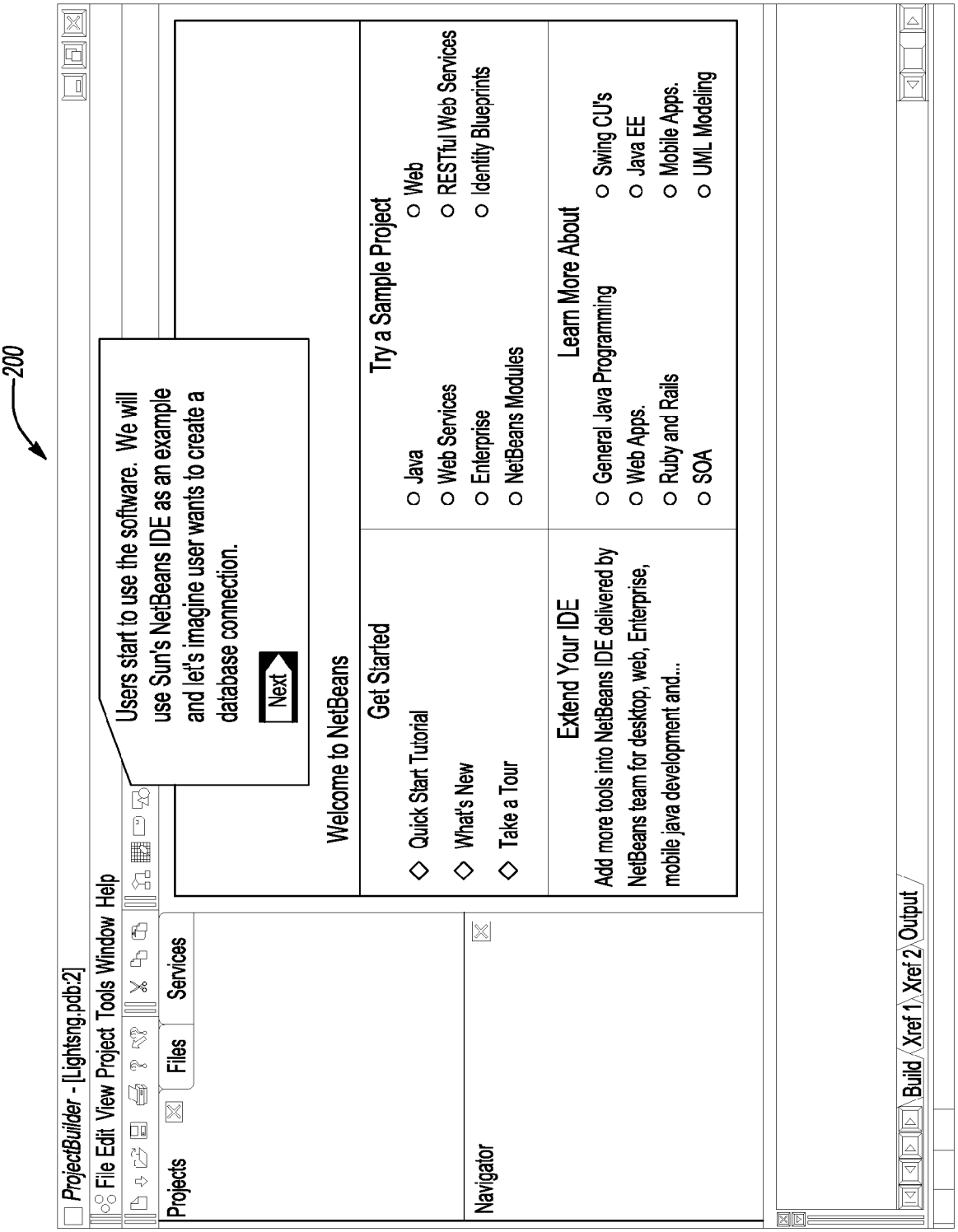
FIG. 4a-4d depicts various screen displays depicting various capabilities of the system in accordance to one embodiment of the present invention.
Figure 4B:
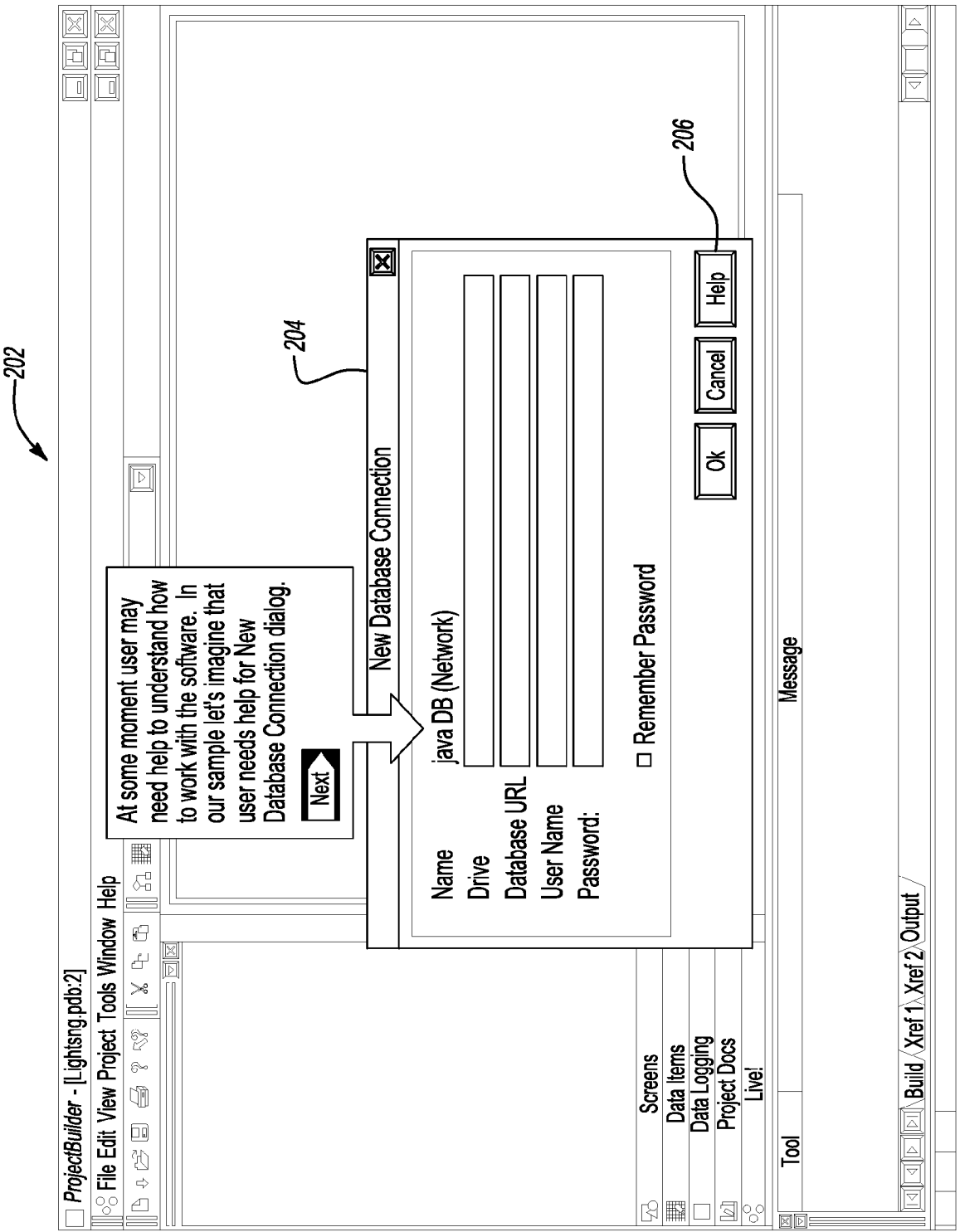
Figure 4C:
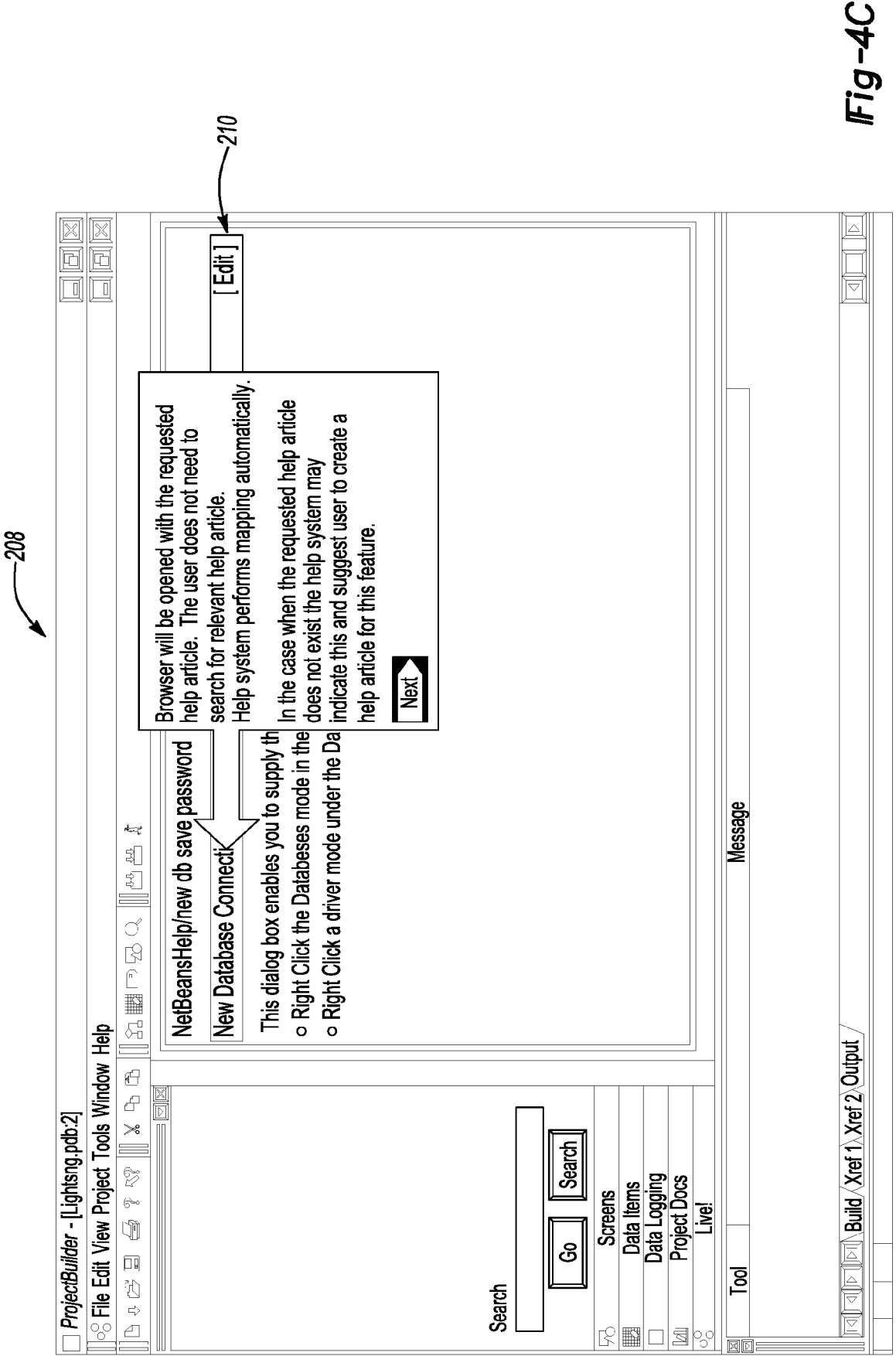
Figure 4D:
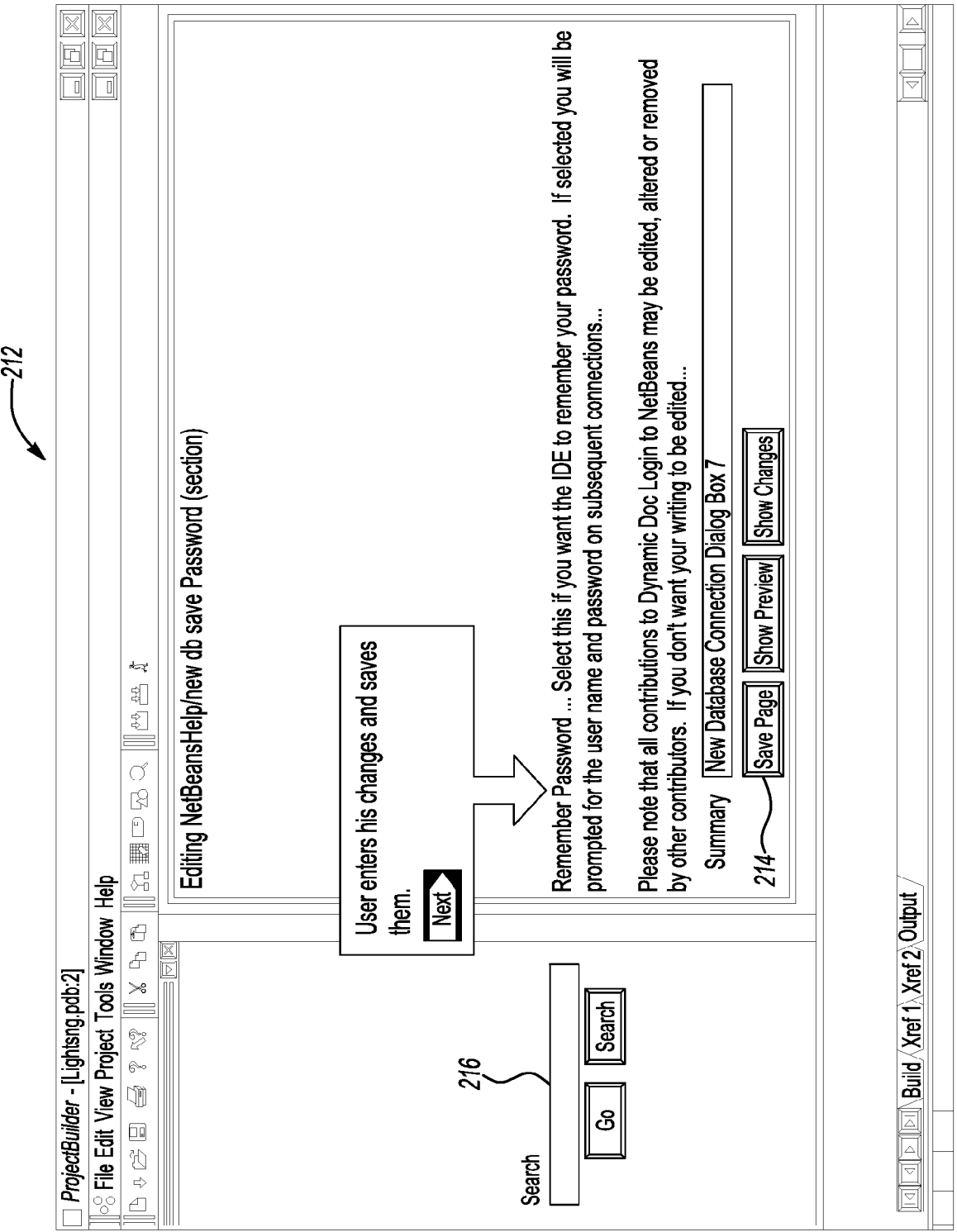

The screen display 200 corresponds to a greeting page a user may expect to encounter in running the NetBeans™ software package. In the screen display 200 the user may intend to create a new database connection. The user may first select the service tab and then select a database tab in an attempt to create the new database connection. The screen display 202 (as shown in FIG. 4b) depicts a prompt (or dialog box) 204 that is presented to the user for creating a new database connection. Assuming that the user does not know how to create the new database connection, the user may select the "help" button 206 of the dialog box 204 as shown in the screen display 202.

The screen display 208 opens in response to the user selecting the help button 206 of the screen display 202. As shown the screen display 208 is shown as a web page and the web page shown provides information related to establishing a new database connection dialog box. The web page and the corresponding help information is mapped to the dialog box 204. The mapping of the dialog boxes in the software package and to the corresponding help information in the software documentation 12 is discussed above in connection with FIG. 3. The web page opened in response to the user clicking the help button 206 provides help information that is relevant with the item or operation needing instruction or guidance. Such a condition may eliminate the need for the user to perform additional searching in the software documentation 12.

In the case were the requested help information does not exist, the user may select "edit" field 210 to add help information to describe the manner in which a new database connection can be made with the NetBeans software. Further, the user may select the edit field 210 to edit information displayed on the web page, or to leave an inquiry requesting for guidance from other users to provide instruction or guidance in adding a new database connection.

The screen display 212 opens in response to the user selecting the "edit" field of 210 of the screen display 208. The screen display 212 allows the user to enter help information (or comments/inquiries), edit existing help information, or delete help information as needed a contribution to the help information in the software documentation 12. The user may select then save page field 214 so that the changes made to the software documentation 12 are saved and stored in the database 20. The screen display 212 may include "search" field 216 to allow the user to search the software documentation 12 to find a particular item of interest in the event such an item did not come up in response to the user selecting the help button 216 as noted in connection with the screen display 202.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A computer apparatus comprising:
a first computer configured to:
establish a communication link with a second computer relating to an executable software package;
receive a command from the second computer that corresponds to providing software documentation for the executable software package, wherein the software documentation includes help information for the executable software package and separate from the executable software package;
transmit an output to the second computer indicating that the software documentation for the executable software package does not exist;
receive an identification from the second computer indicating an identity of the second computer in response to the output, the second computer for prompting a first user to provide first information corresponding to the identification in response to the output such that the second computer transmits the identification to the first computer;
process second information as transmitted from the second computer if the identity of the second computer is authorized; and
store the software documentation in accordance to the second information,
wherein the second computer is operated by the first user who is not affiliated with a software provider of the executable software package,
wherein the first computer provides the software documentation including the help information that is generated by the first user to a plurality of other computers that are each operated by an end user,
wherein the help information describes the manner in which various operations within the executable software package are executed; and
wherein the help information includes various definitions/terms used in connection with the executable software package, a search engine for locating definitions or help articles, or user interaction attributes such as forums or links to web logs which are directed to the executable software package.

2. The computer apparatus of claim 1 wherein the first computer is further configured to receive second information from the second computer to create help information in the software documentation.

3. The computer apparatus of claim 2 wherein the first computer is further configured to receive third information from the second computer to modify the help information within the software documentation after the help information was created.

4. The computer apparatus of claim 2 wherein the first computer is further configured to receive third information to store an inquiry associated with performing a particular operation with respect to the executable software package on the software documentation transmitted from the second computer.

5. The computer apparatus of claim 2 wherein the first computer is further configured to cooperate with an open source software code to receive the identification and the second information.

6. The computer apparatus of claim 2 wherein the first computer is further configured to receive third information to store an inquiry indicative of additional help information needed in the software documentation from the second computer such that another computer that is not affiliated with the software provider adds the additional help information to the software documentation in response to the inquiry.

7. The computer apparatus of claim 1 wherein the help information corresponds to instructional information related to the manner in which operations within the executable software package are performed.

8. The computer apparatus of claim 1 wherein the first computer is configured to receive the software documentation from the second computer independent of any collaboration from the software provider based on the identity of the second computer being authorized.

9. A method comprising:
establishing, between a first computer and a second computer, a communication link relating to an executable software package;
receiving, at the first computer from the second computer, a command requesting software documentation for the executable software package; wherein the software documentation comprises help information that is for but separate from the executable software package;
transmitting, at the first computer, an output to the second computer indicating that the software documentation for the executable software package does not exist;
receiving, at the first computer, an identification from the second computer indicative of an identity of the second computer in response to the output, the second computer for prompting a first user to provide first information corresponding to the identification in response to the output such that the second computer transmits the identification;
processing second information as transmitted from the second computer if the identity of the second computer is authorized;
storing, at the first computer, the software documentation in accordance to the second information,
wherein the second computer is operated by the first user who is not affiliated with a software provider of the executable software package, and
transmitting, at the first computer, the software documentation including the help information that is generated by the first user to a plurality of other computers that are each operated by an end user,
wherein the help information describes the manner in which various operations within the executable software package are executed; and
wherein the help information includes various definitions/terms used in connection with the executable software package, a search engine for locating definitions or help articles, or user interaction attributes such as forums or links to web logs which are directed to the executable software package.

10. The method of claim 9 further comprising receiving second information, at the first computer, to create help information in the software documentation.

11. The method of claim 10 further comprising receiving third information, at the first computer, to modify the help information within the software documentation after the help information was created.

12. The method of claim 10 further comprising receiving third information, at the first computer, to store an inquiry associated with performing a particular operation with respect to the executable software package on the software documentation.

13. The method of claim 10 further comprising receiving third information, at the first computer, to store an inquiry indicative of additional help information needed in the software documentation from the second computer such that another computer that is not affiliated with the software provider adds the additional help information to the software documentation in response to the inquiry.

14. The method of claim 9 wherein the help information corresponds to instructional information related to the manner in which operations within the executable software package are performed.

15. The method of claim 9 further comprising receiving, at the first computer, the software documentation from the second computer independent of any collaboration from the software provider prior to storing, at the first computer, the software documentation in accordance to the second information.

* * * * *